United States Patent
Nozaki

(10) Patent No.: US 8,345,302 B2
(45) Date of Patent: Jan. 1, 2013

(54) IMAGE PROCESSING METHOD

(75) Inventor: Akira Nozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 12/573,457

(22) Filed: Oct. 5, 2009

(65) Prior Publication Data

US 2010/0085600 A1    Apr. 8, 2010

(30) Foreign Application Priority Data

Oct. 7, 2008    (JP) .................... 2008-260436

(51) Int. Cl.
G06K 15/00    (2006.01)
H04N 1/40    (2006.01)

(52) U.S. Cl. ...................... 358/1.18; 358/448

(58) Field of Classification Search ............... None
See application file for complete search history.

(56) References Cited

U.S. PATENT DOCUMENTS 6,604,157 B1 * 8/2003 Brusky et al. .................. 710/65
2008/0168168 A1 * 7/2008 Hamilton et al. .............. 709/224
2009/0013255 A1 * 1/2009 Yuschik et al. ................ 715/728

FOREIGN PATENT DOCUMENTS

| JP | 10-275209 A | 10/1998 |
| JP | 2000-316065 A | 11/2000 |
| JP | 2003-152934 A | 5/2003 |
| JP | 2006-135877 A | 5/2006 |

* cited by examiner

Primary Examiner — Marivelisse Santiago Cordero
Assistant Examiner — Mesfin Getaneh
(74) Attorney, Agent, or Firm — Canon USA, Inc., IP Division

(57) ABSTRACT

There is provided a method for image processing to transfer scanned data of a document read by an image reading apparatus to an application which is operated in an information processing apparatus connected to the image reading apparatus. The method includes obtaining an execution path of an application which is currently operated in the information processing apparatus, and transferring the scanned data to the image reading apparatus by using the execution path.

9 Claims, 5 Drawing Sheets

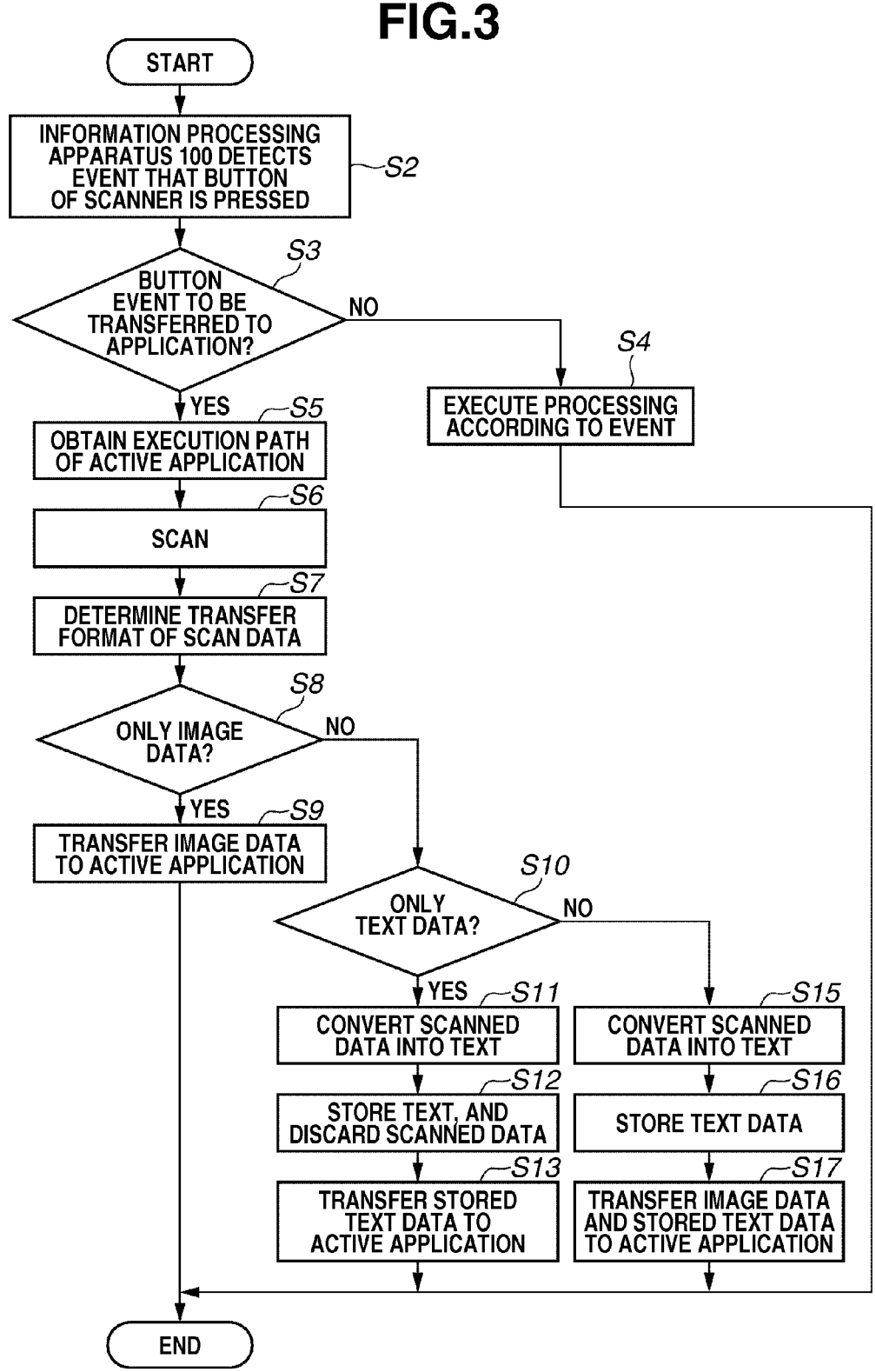

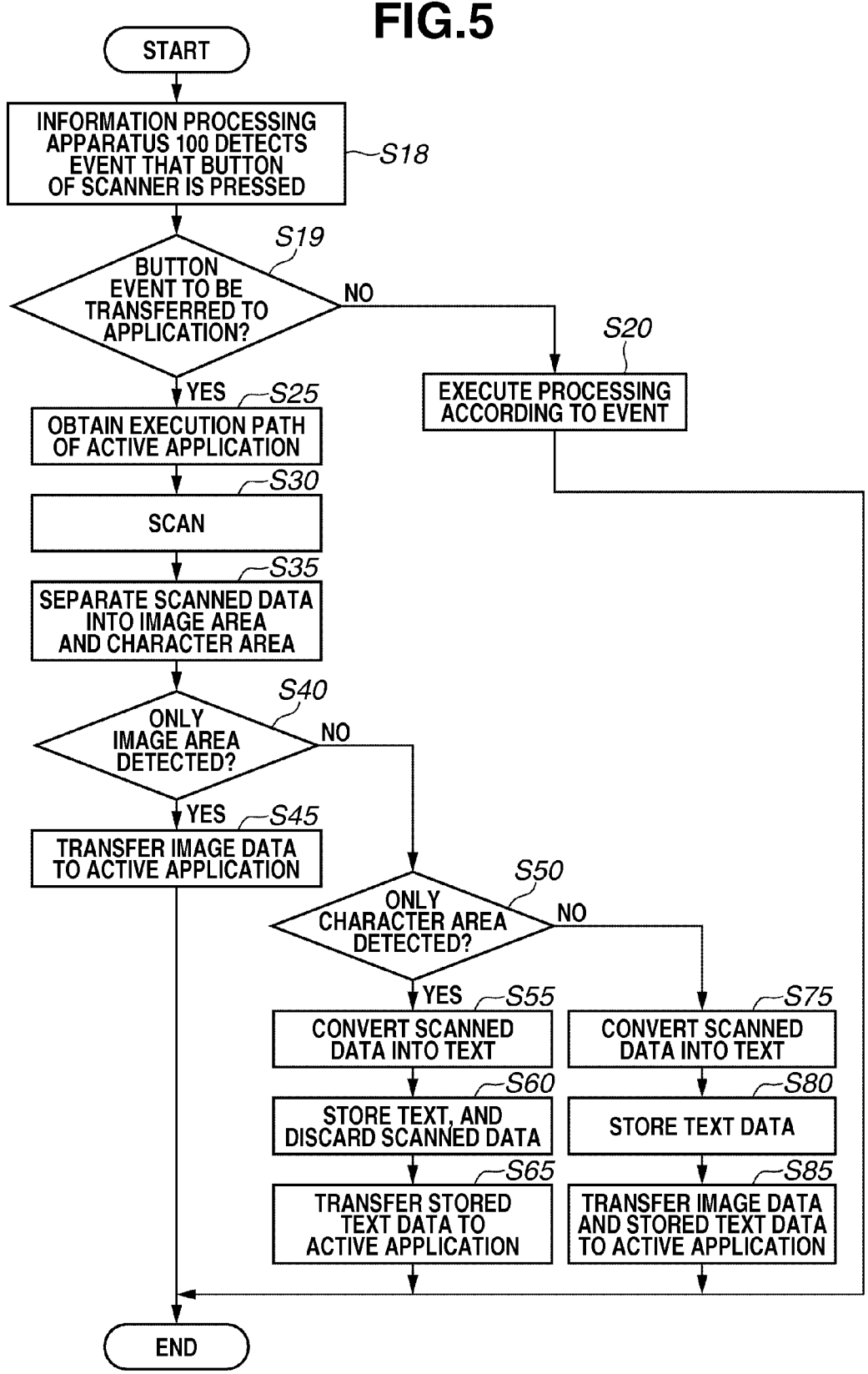

IMAGE PROCESSING METHOD

BACKGROUND OF THE INVENTION

1. Field of the Invention

The present invention relates to an image processing method for transferring scanned image data by a desired application.

2. Description of the Related Art

As discussed in Japanese Patent Application Laid-Open No. 10-275209, a system has conventionally been known, which simply analyses read image data to determine an adaptive application program and instructs a device to start the determined adaptive application program.

Japanese Patent Application Laid-Open No. 2000-316065 discusses a system that scans data from a user interface of a peripheral device to transfer scanned data to a selected application.

In these conventional examples, when the selected application basically processes text data, an image is converted into an appropriate text file.

However, the system discussed in Japanese Patent Application Laid-Open No. 10-275209 automatically determines an application to be started according to a type of image data obtained by analysis, hence, depending on a result of the analysis, the data is not always transferred to an application desired by a user.

In the system discussed in Japanese Patent Application Laid-Open No. 2000-316065, a host computer and the peripheral device communicate with each other about application information, and an application installed in the host computer is displayed on the peripheral device side for selection. Thus, the peripheral device has to select an application of a transfer destination of the data each time.

SUMMARY OF THE INVENTION

The present invention is directed to a method that can properly display scanned data on an application of a transfer destination.

According to an aspect of the present invention, there is provided a method for image processing to transfer scanned data of a document read by an image reading apparatus to an application which is operated in an information processing apparatus connected to the image reading apparatus. The method includes obtaining an execution path of an application which is currently operated in the information processing apparatus, and transferring the scanned data to the image reading apparatus by using the execution path.

According to another aspect of the present invention, there is provided a computer-readable storage medium which stores a program for causing an information processing apparatus to execute a method for image processing to transfer scanned data of a document read by an image reading apparatus to an application which is currently operated in the information processing apparatus connected to the image reading apparatus.

According to an exemplary embodiment of the present invention, read (scanned) data can be displayed by an application intended by a user without designating any application to be started to display the scanned data. As a result, convenience can be greatly improved.

Further, according to the exemplary embodiment, the scanned data can be displayed by the application intended by the user without changing any designated contents which are displayed by other applications. As a result, convenience can be greatly improved.

The scanned data is converted into data according to a display capability (e.g., supporting only text data, only image data, or both) of an application of a transfer destination and transferred. Thus, the scanned data can be properly displayed on the application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating an operation of the first exemplary embodiment.

FIG. 5 is a flowchart illustrating an operation of a second exemplary embodiment of the present invention.

DESCRIPTION OF THE EMBODIMENTS

Various exemplary embodiments, features, and aspects of the invention will be described in detail below with reference to the drawings.

Figure 1:
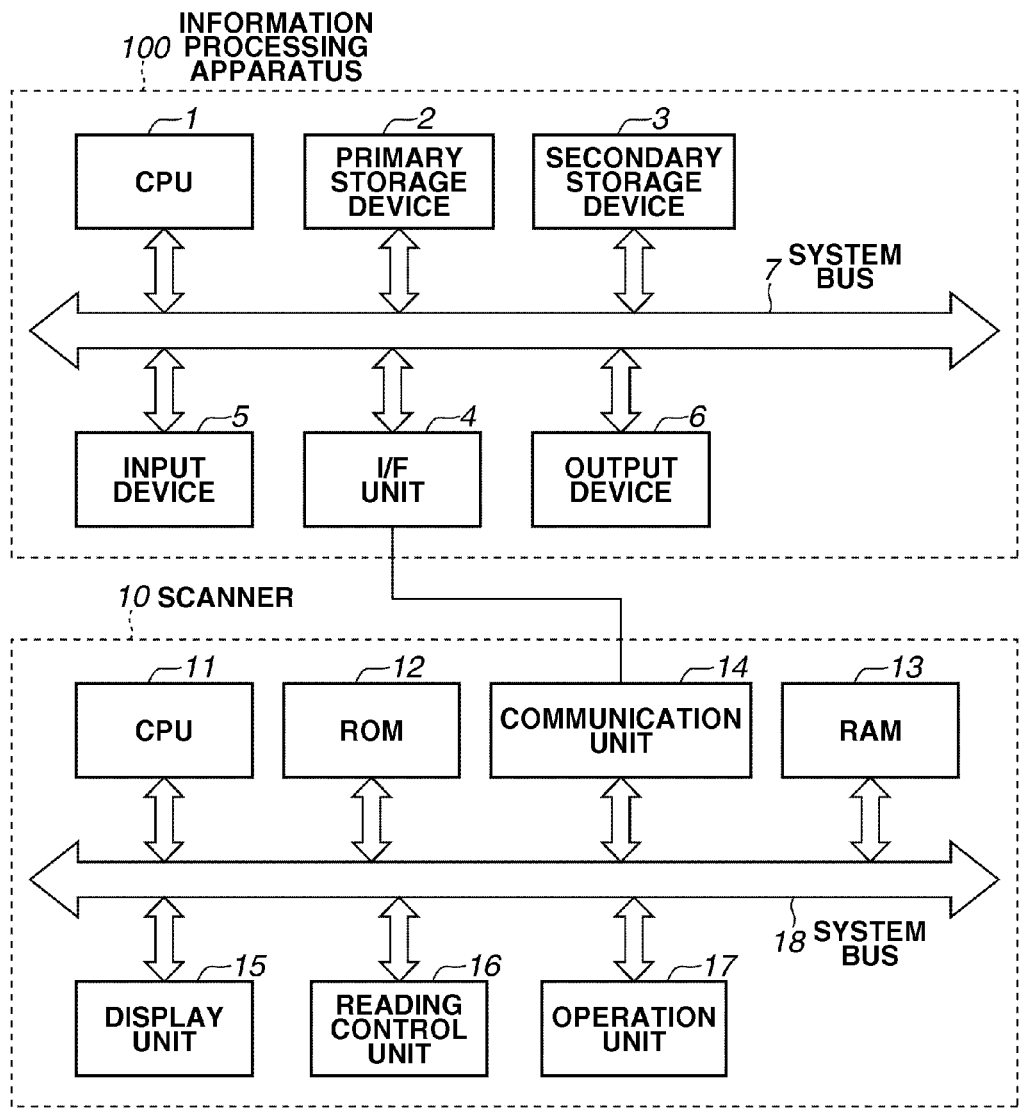
FIG. 1 is a block diagram illustrating an information processing apparatus according to a first exemplary embodiment of the present invention.

FIG. 1 is a block diagram illustrating an information processing apparatus 100 according to a first exemplary embodiment of the present invention.

The information processing apparatus 100 is an example of an image processing apparatus that performs scanning in a reading apparatus including an image reading function and displays scanned data of a read document by an application of a host computer. In other words, the information processing apparatus 100 may be a host personal computer (PC), and implements a method for performing scanning in the reading apparatus including the image reading function and displaying scanned data by the application of the host computer. The image processing apparatus 100 is connected to a scanner 10. The image processing apparatus 100 includes a central processing unit (CPU) 1, a primary storage device 2, a secondary storage device 3, an interface (I/F) unit 4, an input device 5, an output device 6, and a system bus 7.

The scanner 10 includes a CPU 11, a read-only memory (ROM) 12, a random access memory (RAM) 13, a communication unit 14, a display unit 15, a reading control unit 16, an operation unit 17, and a system bus 18.

The CPU 1 performs calculation, determination or control of data or a command, and execution of a program stored in the primary storage device 2. The primary storage device 2 is mainly configured by a memory for loading and storing a program or the like stored in the secondary storage device 3.

The secondary storage device 3 is, for example, a hard disk. In the first exemplary embodiment, a program is stored in the secondary storage device 3, and loaded to the primary storage device 2 to be executed by the CPU 1. The I/F unit 4 is, for example, a universal serial bus (USB) interface for communicating with a scanner which includes a reading function.

The input device 5 is, for example, a mouse, a keyboard, or a controller. The output device 6 is, for example, a display. The system bus 7 is a transmission path for transferring a command or data between the CPU 1 and the I/F unit 4, the output device 6, or the storage devices 2 and 3. The scanner 10 is connected to the information processing apparatus 100 via the I/F unit 4.

The CPU 11 includes a microprocessor that controls the RAM 13, the communication unit 14, the display unit 15, the reading control unit 16, and the operation unit 17 according to a program stored in the ROM 12. The RAM 13 stores scanned image data sent from the reading control unit 16.

The communication unit 14 communicates with the information processing apparatus 100 when the data stored in the RAM 13 or button event information is sent to the information processing apparatus 100, or conversely when a command for controlling the scanner from is received from the information processing apparatus 100.

The reading control unit 16 includes a direct memory access (DMA) controller, an image processing integrated circuit (IC), a complementary metal oxide semiconductor (CMOS) logic IC or the like, and converts the scanned image data into multi-valued or binarized data to sequentially send them to the RAM 13.

The display unit 15 includes a light-emitting diode (LED) or the like, and displays a status during operation setting or an operation of the scanner. The operation unit 17 includes a power switch, a reset switch, an operation selection button, a scan button and the like, and can be freely operated by a user.

Figure 2:
FIG. 2 is a schematic diagram of a display screen illustrating an example of a user interface of a utility which is started on the information processing apparatus to set a transfer destination in an active application in an information processing method of the first exemplary embodiment.

FIG. 2 is a schematic diagram of a display screen illustrating an example of a user interface 20 of a utility which is started in the information processing apparatus 100 to set a transfer destination in an active application according to the information processing method of the first exemplary embodiment.

The user interface 20 displays an event selection section 21, an operation setting section 22, and a start application setting section 23.

The event selection section 21 selects and sets an operation according to a button even. A user can select various events such as "store in a Joint Photographic Experts Group (JPEG) format", "store in a portable document format (PDF) format", "transfer to an application" and the like.

The operation setting section 22 is used for setting an operation for the event selected by the event selection section 21 when the button event is received from the scanner 10.

The start application setting section 23 is displayed when an even of "OPEN BY APPLICATION" is selected in the event selection section 21, and used for setting an application to which the scanned image data is transferred. This setting is set in an active application.

The CPU 1 issues a scan start event from a peripheral device to the host computer and starts a utility for scanning using a scanner driver that can control a reading operation of the peripheral device. The CPU 1 determines whether the scan start event starts up the utility.

The scanner 10 reads an image using the scanner driver according to reading setting when the scan start event is issued.

The CPU 1 obtains an execution path of an application which is active in the information processing apparatus 100 when the scan start event is issued.

The I/F unit 4 transfers scanned data to the active application.

Next, an operation of the first exemplary embodiment will be described.

FIG. 3 is a flowchart illustrating the operation of the first exemplary embodiment.

In step S2, the information processing apparatus 100 detects an event that an "OPEN BY APPLICATION" event is selected by the operation unit 17 of the scanner 10 and sent from the communication unit 14.

In step S3, the information processing apparatus 100 starts the utility using a service of an operating system (OS) or the like. The utility determines whether the event is for opening an application. A content of the event is obtained by using an application programming interface (API) of the OS or the like. A tool for obtaining an event may be used in place of using the service or the API of the OS.

If the event is different from the "OPEN BY APPLICATION" event (NO in step S3), then in step S4, processing based on a content set by the event selection section 21 of FIG. 2, for example, processing corresponding to an event for scanning and storing data in a PDF format, and attaching the data to E-MAIL, is executed.

If the event is determined as the "OPEN BY APPLICATION" (YES in step S3), then in step S5, the utility obtains an execution path of a currently active application using APIs of a plurality of OSs. For example, when an OS is Windows (registered trademark), the utility first obtains a handle of the active window, and obtains process ID that has created the window from the window handle.

Alternatively, the utility obtains a handle of a forefront window, and obtains class information of the window. If the class information is about a class of a target to which data stored by the utility is transferred, a process ID is obtained from the window handle. If the class information is about a class other than a target to which the data stored by the utility is transferred, a handle of a window which is at a back of the forefront window is obtained to execute similar processing.

The utility obtains all pieces of process information by a snapshot and compares them with the ID of the process that has created the active window. The utility obtains a path of the application from the process information matched with the process ID.

In place of obtaining the handle of the active window, the utility may execute the following. A list of window handles is obtained from the OS, and when the window handles can be obtained in stacked order of windows, the window handle which is obtained first can be used as a handle of a currently active window.

When all applications that have been started are minimized and it is determined that there is no currently active application, or when a desk top screen is currently displayed, an active application is determined as follows. In such a case, a window on a top of Z order that indicates stacked order of windows obtainable using the API of the OS is regarded as the active application.

When a dynamic link library (DLL) of the system is obtained as an execution path, the DLL cannot be started because it is not an application. Thus, an active application is determined using a handle of a window second highest in the Z order.

In addition to the above methods, if an API which can acquire a path of a currently active application is prepared on the OS side, the API may be used. A method for determining a path of an active application is not limited to the above.

In step S6, the scanner 10 performs scanning via the scanner driver based on the content set by the operation setting section 22 of FIG. 2.

After completion of the scanning, in step S7, a transfer format of the scanned data is determined. The determination is executed by displaying a dialog to cause the user to select a format. If an application has performed the determination of the transfer format before, a previous result is stored, and processing can be continued according to the previous selection result without displaying any dialog. The transfer format may be stored beforehand in a database for each application. When an application of a transfer destination is determined, a transfer format corresponding to the application may be determined by reading from the database.

In step S8, if the transfer data format is only for image data (YES in step S8), then in step S9, the active application obtained in step S5 is started using the scanned data as a command line argument. At this point, to notify the application of the transfer destination of the on-going transfer of the scanned data, the application is started by a command line argument in which a parameter of the scanned data is added in addition to the path of the scanned data.

An example of a command line can be described as follows: "c:¥programfiles¥microsoft office¥office12¥winword. Exe"/i"c:¥Image_0001.bmp" "c:¥Image_0002.bmp". "Microsoft" is a registered trademark.

In step S10, if the transfer data format is determined to be only for text data (YES in step S10), then in step S11, the utility converts the scanned data into text data. As a method for conversion into text data, a method for extracting a text area by executing OCR processing for the scanned data, or the like can be used. There are no particular restrictions on a method for conversion into text.

In step S12, the data converted into the text data is stored, and the scanned data is discarded. In other words, the scanned data is not necessary after it is converted into the text data, and hence removed from the secondary storage device 3.

In step S13, the utility designates a path of the text data stored in step S12 as a command line argument and starts the active application obtained in step S5.

If determination is NO in both of steps S8 and S10, the transfer data format is determined to be for both image data and text data. In step S15, the utility converts the scanned data into text data. In step S16, the utility stores the text data in the secondary storage device 3.

In step S17, the utility transfers the scanned data and the text data stored in step S16 as command line arguments to the active application obtained in step S5 to be executed.

At this point, to notify the application of the transfer destination of the on-going transfer of the image data, a parameter of the image format is added in addition to the execution path to start the command line.

Figure 4A:
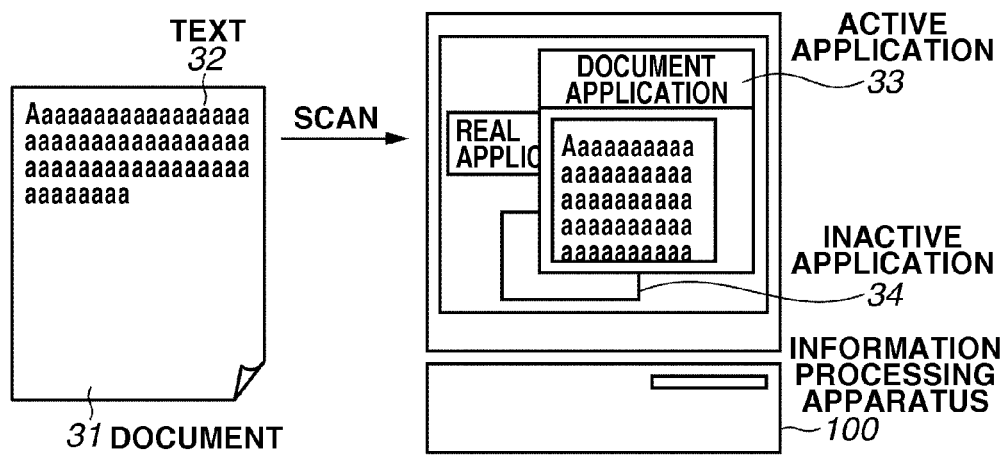
FIGS. 4A to 4C illustrate statuses of data which is read by a scanner and transferred to an application.
Figure 4B:
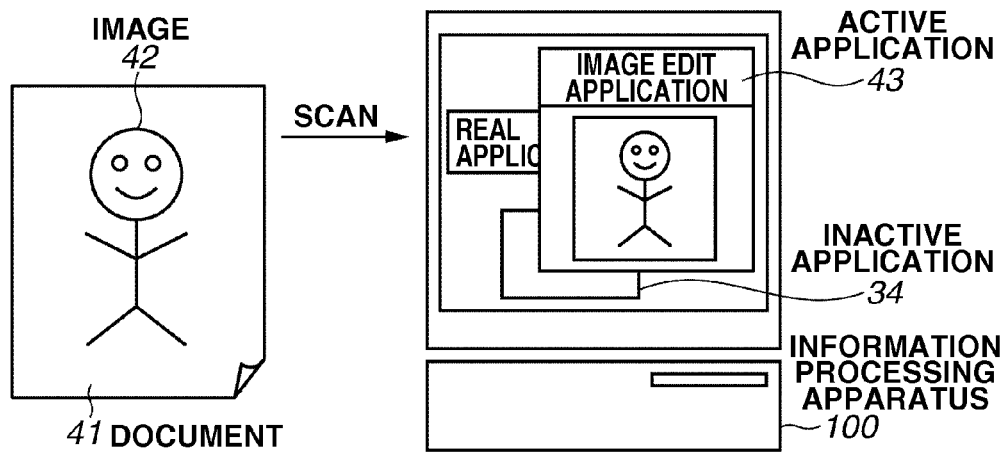
Figure 4C:
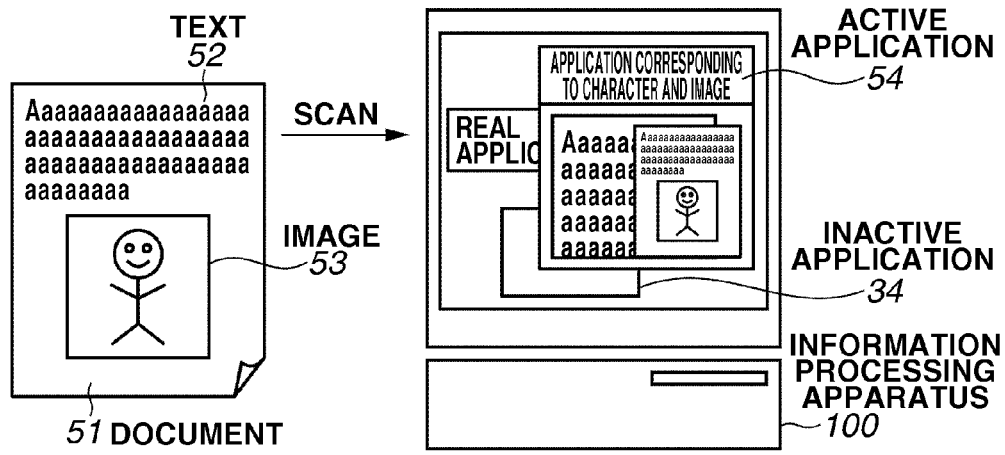

FIGS. 4A to 4C illustrate statues of data which is read by the scanner and transferred to the application.

FIGS. 4A to 4C are schematic diagrams respectively illustrating a case where data to be transferred includes only a text, a case where data to be transferred includes only an image, and a case where data to be transferred includes a text and an image.

FIG. 5 is a flowchart illustrating an operation of a second exemplary embodiment of the present invention.

In the processing method of the first exemplary embodiment, the transfer format of the scanned data is determined by user's selection on the dialog. However, in the second exemplary embodiment, the transfer format is automatically determined without causing the user to select it on the dialog.

Steps S18 to S30, S45, S55 to S65, and S75 to S85 are similar to those of the flowchart of FIG. 3 of the first exemplary embodiment, and hence description thereof will be omitted.

In step S35, scanned image data is separated into an image area and a character area. An arbitrary method may be used for the separation processing. In the second exemplary embodiment, an image area and a character area are discriminated from each other based on values obtained by conventional fast Fourier transformation.

In step S40, if only an image area is detected or no character area is detected (YES in step S40), it is determined that the scanned data includes only image data. In step S45, the image data is transferred to an active application.

In step S50, if only a character area is detected (YES in step S50), it is determined that the scanned data includes only text data, and processing in steps S55 to S65 are executed. In this case, if an active application cannot process text data, the text data is converted into image data to be sent.

If determination is NO in both steps S40 and S50, it is determined that the scanned data includes both image data and text data, and processing in steps S75 to S85 are executed. In this case, if an active application cannot process the image data, only the text data is transferred. If an active application cannot process the text data, the text data is converted into image data to be transferred.

A recording (storage) medium which stores program codes (programs) of software for realizing the functions of the above described exemplary embodiments may be supplied to a system or an apparatus, and a computer (CPU or micro processing unit (MPU)) of the system or the apparatus may read the program codes stored in the recoding medium to execute them. In this case, the program codes read from the recording medium realize the functions of the first and second exemplary embodiments, and the recording medium storing the program codes constitutes the present invention.

The recording medium for supplying the program codes can include, for example, a flexible disk, a hard disk, an optical disk, a magneto-optical disk, a compact disc (CD)-ROM, a CD-readable (CD-R), a magnetic tape, a nonvolatile memory card, a ROM, and a DVD.

Based on instructions of the program codes read from the recording medium by the computer, the operating system (OS) or the like running on the computer can execute a part or all of actual processing to realize the functions of the exemplary embodiments. This case is included in the present invention.

The program codes read from the recording medium are written in a function extension board inserted into the computer or a function extension unit connected to the computer. Then, based on instructions of the program codes, a CPU or the like disposed in the function extension board or the function extension unit can execute a part or all of actual processing to realize the functions of the exemplary embodiments. This case is included in the present invention.

An image processing apparatus including a peripheral device and a computer formed integrally, whose configuration can realize the functions of the exemplary embodiments, is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-260436, filed on Oct. 7, 2008, which is hereby incorporated by reference herein in its entirety.

What is claimed is:

1. A method for image processing to display scanned data of a document read by an image reading apparatus on an application which is operated in an information processing apparatus connected to the image reading apparatus, the method comprising:
- obtaining window information indicating stacking of windows when the information processing apparatus receives a command to start scanning from the image reading apparatus, the window information being stored in the information processing apparatus;
- determining an execution path of an application which is currently operated in the information processing apparatus based on window information of a window stacked at the forefront;
- converting the scanned data into a format which is displayable by the currently operated application;
- storing the converted scanned data in a storing unit of the information processing apparatus; and
- displaying the scanned data on the application by starting the application using the execution path to which information of a storing destination of the converted scanned data is added as stored information.

2. The method according to claim 1, further comprising:
- causing a user to designate the format; and
- converting the scanned data according to the instructed format to transfer the scanned data.

3. The method according to claim 1, wherein the information processing apparatus further includes a storing unit configured to store information regarding a format by which the scanned data was transmitted in the past and a transfer format of an image complying with the application, and the scanned data is converted according to information stored in the storing unit, to be transferred.

4. The method according to claim 1, further comprising:
- analyzing the scanned data; and
- converting the scanned data according to the analyzed content to transfer the scanned data.

5. The method according to claim 1, wherein the format is any one of: image data which is an image area of the scanned data, text data which is a text area of the scanned data, and both the image data and the text data.

6. The method according to claim 1, wherein the information processing apparatus further includes a storage unit configured to store an execution path of an application of a transfer destination and the format, and the execution path of the application of the transfer destination and the format are obtained from the storage unit.

7. The method according to claim 1, further comprising:
- obtaining an execution path of an application, a window screen of which is displayed at the forefront among window screens displayed on the display unit;
- storing information regarding a window which is not engaged in transferring the scanned data; and
- obtaining, when the window is at the forefront, an execution path of an application of a window which is displayed at the front among windows displayed on a back of the window.

8. The method according to claim 1, further comprising:
- rewriting the execution path by adding a parameter relating to the scanned data to the execution path; and
- transferring the scanned data by using the rewritten execution path.

9. A non-transitory computer-readable storage medium which stores a program for causing an information processing apparatus to execute the method of claim 1.

* * * * *